US006409862B1

(12) United States Patent
Kliesch et al.

(10) Patent No.: US 6,409,862 B1
(45) Date of Patent: Jun. 25, 2002

(54) PROCESS FOR PRODUCING BIAXIALLY ORIENTED PET FILMS AND USE OF THE SAME FOR SMD-TECHNOLOGY FILM CAPACITORS

(75) Inventors: Holger Kliesch, Mainz-Kastel; Gottfried Hilkert, Saulhelm; Rainer Kurz, Hettenheim; Franz Hora, Kriftel; Annegrete Bursch, Ruedesheim, all of (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 09/384,217

(22) Filed: Aug. 27, 1999

(30) Foreign Application Priority Data

Aug. 27, 1998 (DE) .......................... 198 39 007

(51) Int. Cl.$^7$ ............................................. B60C 11/00
(52) U.S. Cl. ..................... 156/184; 264/464; 264/477; 264/623; 264/638; 264/639; 264/406; 156/244.11
(58) Field of Search ...................... 428/34.8; 264/514, 264/464, 477, 623, 638, 639, 406; 156/184, 244.11, 324

(56) References Cited

U.S. PATENT DOCUMENTS

| | | |
|---|---|---|
| 3,515,626 A | 6/1970 | Duffield |
| 3,958,064 A | 5/1976 | Brekken et al. |
| 4,042,569 A | 8/1977 | Bell et al. |
| 4,252,885 A | 2/1981 | McGrail et al. |
| 4,399,179 A | 8/1983 | Minami et al. |
| 4,493,872 A | 1/1985 | Funderburk et al. |
| 4,615,939 A | 10/1986 | Corsi et al. |
| 4,622,237 A | 11/1986 | Lori |
| 5,236,680 A | 8/1993 | Nakazawa et al. |
| 5,236,683 A | 8/1993 | Nakazawa et al. |
| 5,242,757 A | 9/1993 | Buisine et al. |
| 5,429,785 A | 7/1995 | Jolliffe |
| 5,453,260 A | 9/1995 | Nakazawa et al. |
| 5,468,527 A | 11/1995 | Peiffer et al. |
| 5,506,014 A | 4/1996 | Minnick |
| 6,194,040 B1 * | 2/2001 | Delius et al. ............... 428/34.8 |

FOREIGN PATENT DOCUMENTS

| | | |
|---|---|---|
| EP | 0 035 835 | 9/1981 |
| EP | 0 061 769 | 10/1982 |
| EP | 0 088 635 | 9/1983 |
| EP | 0 124 291 | 11/1984 |
| EP | 0 135 451 | 3/1985 |
| EP | 0 144 878 | 6/1985 |
| EP | 0 236 945 | 9/1987 |
| EP | 0 296 620 | 12/1988 |
| EP | 0 347 646 | 12/1989 |
| EP | 0 378 154 | 7/1990 |
| EP | 0 378 955 | 7/1990 |
| EP | 0 402 861 | 12/1990 |
| EP | 0 490 665 | 6/1992 |
| EP | 0 502 745 | 9/1992 |
| EP | 0 514 129 | 11/1992 |
| EP | 0 515 096 | 11/1992 |
| EP | 0 580 404 | 1/1994 |
| EP | 0 602 964 | 6/1994 |
| EP | 0 604 057 | 6/1994 |
| EP | 0 609 060 | 8/1994 |
| EP | 0 612 790 | 8/1994 |
| EP | 0 659 810 | 6/1995 |
| EP | 0 663 286 | 7/1995 |
| EP | 0 685 509 | 12/1995 |
| EP | 0 707 979 | 4/1996 |
| EP | 0 826 478 | 3/1998 |
| EP | 0 878 298 | 11/1998 |
| WO | WO 94/13476 | 6/1994 |
| WO | WO 94/13481 | 6/1994 |
| WO | WO 98/13414 | 4/1998 |
| WO | WO 98/13415 | 4/1998 |
| WO | WO 88/10188 | 12/1998 |

OTHER PUBLICATIONS

Barendrecht, W., et al., *Harze natürliche*, in Ullmann's Encyklopädie der Techn. Chemie [Ullman's Encyclopedia of Industrial Chemistry] 4$^{th}$ Ed., vol. 12, pp 525–554. (Ullman ed., 1976).

Utz, H., Barriereeigenschaften Aluminiumbedampfter Kunststoffolien [Barrier Properties of Aluminum–Metalized Plastic Film] 66–68 (1995)(Unpublished dissertation, Technische Universität (Munich)).

Kimura, F. et al., *FTIR Spectroscopic Study on Crystallization Process of Poly (ethylene–2,6–naphthalate)*, 35 Journal of Polymer Science: Polymer Physics 2741–2747 (1997).

Bursch et al., "Biaxially Oriented Polyester Film for SMD Condensers—Made by Extrusion Followed by Biaxial Stretching and Heat Fixing to Give Specified Shrinkage Parameters in the Machine Direction and Transverse Direction." Derwent Abstract, WPI Acc. No. 98–194495/199818 (1998).

Database WPI, Section Ch, Week 9615, Derwent Publications Ltd., London, GB; AN 96–148338, XP002114377 & JP 08036739 A (Torray Indus., Inc.) (Feb. 6, 1996).

Database WPI, Section Ch, Week 9522, Derwent Publications Ltd., London, GB; AN 95–166886, XP002114408 & JP 07 088952 A (Toray Indus., Inc.) (Apr. 4, 1995).

Weiss, J., *Parameters that influence the barrier properties of metallized polyester and polypropylene films*, 204 Thin Solid Films 203–216 (1991).

* cited by examiner

Primary Examiner—Merrick Dixon
(74) Attorney, Agent, or Firm—Finnegan, Henderson, Farabow, Garrett & Dunner L.L.P.

(57) ABSTRACT

Process for producing biaxially oriented PET film for use in film capacitors with SMD capabilities and its use for SMD-technology film capacitors The invention describes a process for producing a biaxially oriented film of thickness <10 $\mu$m, where a polymer melt is extruded through the gap of an extrusion die onto a chill roll, stretched longitudinally and transversely and relaxed longitudinally by >0.1% and transversely by >3%, where the edges of the film are held during the longitudinal and transverse relaxation and the film is wound up.

7 Claims, No Drawings

PROCESS FOR PRODUCING BIAXIALLY ORIENTED PET FILMS AND USE OF THE SAME FOR SMD-TECHNOLOGY FILM CAPACITORS

The present invention relates to a process for producing polyester films, in particular PET films, which, due to their shrinkage properties, are particularly suitable for producing SMD-technology (surface mount device-technology) capacitors. Particularly for capacitors used in SMD technology, there is a need for films with low thickness and resistance to temperature variation at the temperatures arising during soldering. Low thickness and resistance to temperature variation provides advantages in terms of space utilization in the capacitor and of the soldering procedure.

BACKGROUND OF THE INVENTION

PEN films and PPS films are currently used for SMD-technology film capacitors. PEN films and PPS films have a markedly higher melting point than PET films (about 255° C.). The melting point of PEN is about 265° C. and that of PPS is about 285° C. However, a decisive disadvantage is the high costs for these PEN films and PPS films.

For reasons of cost there has been a trend for some years in the electronics industry away from wired components to components with SMD capabilities. This trend also applies to the capacitor sector. SMD capacitors are mounted and soldered directly on the PCB (printed circuit board). While specific components making up SMD capacitors do not strongly differ from traditional leaded capacitors, the main difference is that a SMD capacitor has no leads. Additionally, there are usually minor differences in the contact areas, but this is not an essential difference. The manufacture of SMD capacitors is also similar to the production of traditional leaded capacitors. The film is metallized and slit. The slit rolls are wound to capacitors, schooped, and heat treated. Finally, the metal contacts are sprayed on the schoop layer or dipped in molten metal. No leads are attached to the metal end contacts. In addition to winding capacitors, it is also possible to produce stacked SMD capacitors. For stacked capacitors, the slit rolls are wound on big wheels, schooped, and then provided with a metal contact in a manner similar to that for wound capacitors.

A very high percentage of supplies to this market is represented by ceramic SMD capacitors, since capacitors made from other materials are damaged by the temperatures occurring during the SMD soldering process. (Peak temperatures are typically above 225° C. during the widely used reflow soldering process.) Film capacitors are a particular case in point. The abovementioned peak temperatures are in a range in which PET, one of the traditional polymers for film capacitors, begins to melt. In the years past, capacitor producers and film producers have therefore concentrated on polymers with higher melting points, such as PEN and PPS. Other methods have been to use SMD film capacitors produced from PET which are protected by an additional casing from exposure to high temperatures, or SMD capacitors made from PET with a limitation on peak temperatures to hardly more than 200° C. Both methods have markedly restricted application. As described in WO 98/13414 and WO 98/13415, it has been found, surprisingly, that SMD capacitors having particularly low transverse shrinkage can be produced without the abovementioned restrictions from PET films. It was found here that, in contrast to the transverse shrinkage, there must still be significant shrinkage in the longitudinal direction in order to ensure the consolidation needed to obtain an effective capacitor.

Surprisingly, it has now been found that, contrary to the disclosures of WO 98/13414 and WO 98/13415, effective SMD capacitors can also be produced from films whose longitudinal shrinkage is only minimal. Films with particularly low shrinkage values are generally particularly suitable for SMD capacitors since they give particularly low loss of capacitance during soldering.

It is known from EP-A-0 402 861 that a 75 μm film with low shrinkage values in machine direction (MD) and transverse direction (TD) can be produced by relaxing the film in the transverse direction during setting and also permitting longitudinal relaxation. According to EP-A-0 402 861, this longitudinal relaxation is apparently only possible if, after leaving the setting frame, the film is wound up at a speed lower than the speed in the frame. This is possible with the relatively thick films (75 μm) described in that publication, but impossible at film thicknesses <10 μm, since uncontrolled changes in dimensions occur during the free relaxation between the frame and wind-up, resulting in a uniformity of profile which is unacceptable for capacitor films (thickness variation in MD and TD).

Processes as described, for example, in U.S. Pat. No. 4,042,569, in which the longitudinally/transversely stretched film is then relaxed in-line or off-line between rollers in the MD give films with low shrinkage values but also give the difficulties described above, and are also completely uneconomic due to the addition of process steps and reduced process reliability.

WO 88/10188 describes an apparatus and a process for producing polymer films which can be stretched simultaneously longitudinally and transversely with the aid of the apparatus described. Capacitor films produced by a process of this type are described in U.S. Pat. No. 5,429,785. No information is given in this publication about the shrinkage performance of the films. However, it is unlikely that the shrinkage values are particularly low, since the films which it describes do not undergo relaxation.

It was therefore the object of the present invention to provide films with suitable shrinkage values, and in particular a process suitable for producing films of this type.

DESCRIPTION OF THE INVENTION

The abovementioned object of the invention is achieved by means of a process for producing a biaxially oriented film of thickness <10 μm, which comprises extruding a polymer melt onto a chill roll, followed by longitudinal and transverse stretching and relaxation by >0.1% longitudinally and by >3% transversely, where the edges of the film are held during the longitudinal and transverse relaxation.

The object is also achieved by means of a biaxially oriented film of thickness <10 μm having the following properties:

$S_{200}$ (TD)<1.5% and >−0.5%

$S_{200}$ (MD)<2.8% and >−0.5%

The starting material for the novel process is a polymer raw material, in particular a polyester raw material. For the purposes of the invention, polyester raw materials are compositions which are composed predominantly, i.e. to an extent of at least 80% by weight, preferably at least 90% by weight, of a polymer selected from the class consisting of polyethylene terephthalate (PET), polyethylene naphthalate (PEN), poly-1,4-dicyclohexanedimethylene terephthalate (PCT), polyethylene naphthalate bibenzoate (PENBB) and blends of these polymers. Preference is given to polyester raw materials which are composed essentially of ethylene terephthalate units and/or preferably up to 30 mol % of comonomer units, where the glycol component and/or the acid component of the comonomer units may vary. The polyesters may be prepared either by the transesterification process with the usual catalysts, such as salts of Zn, of Ca, of Li or of Mn, or by the direct esterification process.

If desired, the usual additives (particles) used to improve slip and friction properties when producing capacitor films may be present in the polyester raw material, e.g. inorganic pigments, such as kaolin, talc, $SiO_2$, $MgCO_3$, $CaCO_3$, $BaCO_3$, $CaSO_4$, $BaSO_4$, $Li_3PO_4$, $Ca_3(PO_4)_2$, $Mg_3(PO_4)_2$, $TiO_2$, $Al_2O_3$, MgO, SiC, LiF or the Ca, Ba or Mn salts of terephthalic acid. Particles based on other organic pigments, e.g. polystyrenes, polyacrylates or polymethacrylates, may also be added. The concentration of the particles used is preferably from 0.005 to 5.0% by weight, particularly preferably from 0.01 to 2.0% by weight (based on the weight of the layer). The average particle size is from 0.001 to 10 μm, preferably from 0.005 to 5 μm. The polyester films may be either monofilms or composite, if desired coextruded, films with identically or differently constructed surfaces, where one surface is for example pigmented and the other surface is unpigmented. Known is processes may be used to provide one or both surfaces of the film with a conventional functional coating.

In the novel process for producing the polymer film, the molten polymer, in particular the polyester, is extruded through a gap of an extrusion die, for example a slot die, and quenched on a chill roll in the form of a substantially amorphous prefilm. The film is then reheated and stretched longitudinally and transversely, or transversely and longitudinally, or longitudinally/transversely and again longitudinally and/or transversely. The film is moreover relaxed longitudinally and transversely while its edges are held. The longitudinal relaxation is carried out by using a film speed on exit from the edge-holding apparatus which is lower than the maximum longitudinal film speed within the edge-holding apparatus. The transverse relaxation is brought about by convergent guiding in the edge-holding apparatus. A preferred edge-holding apparatus is a simultaneous stretching frame, as described, for example, in WO 88/10188. Both the relaxation and the stretching may be carried out in this frame. One of the advantages of the apparatus of WO 88/10188 is that the steps of stretching (MD+TD), relaxation and setting may be divided up, swapped over, and carried-out in various zones of the apparatus. The stretching temperatures are usually from $T_g+10°$ C. to $T_g+60°$ C., the stretching ratio for longitudinal stretching is usually from 2 to 6, in particular from 3 to 4.5, and that for the transverse stretching is from 2 to 5, in particular from 3 to 4.5, and that for any second longitudinal stretching carried out is from 1.1 to 3. If desired, the first longitudinal stretching may be carried out simultaneously with the transverse stretching (simultaneous stretching). The heat-setting of the film is carried out at oven temperatures of from 200 to 260° C., in particular from 220 to 250° C.

The relaxation—both longitudinal and transverse—takes place in the edge-holding apparatus at temperatures from $T_g+10°$ C. to 250° C. The longitudinal relaxation is at least 0.1%, preferably>0.5%, in particular>0.7%. Relaxations>6.0% are not useful. The transverse relaxation is at least 3%, preferably>5%. Transverse relaxations of>15% are not useful.

The novel process can give a longitudinal film shrinkage at 200° C. ($S_{200}$ MD) of <4%, preferably<3.3%, particularly preferably<2.7%. The transverse shrinkage achievable at 200° C. ($S_{200}$ TD) is<2.0%, preferably<1.0%. At the other end of the scale the novel process can achieve shrinkage at 200° C. of>−0.5%, preferably >0.0%, in particular>0.5%.

The novel film has a thickness of<10 μm, preferably≦8 μm and in particular ≦5 μm.

The transverse shrinkage of the novel film at 200° C. is<1.5%, preferably<1.0% and particularly preferably<0.8%. The minimum shrinkage is−0.5%, preferably >0.0%. The longitudinal shrinkage of the novel film at 200° C. ($S_{200}$) is<2.8%, preferably<2.5%, in particular<2.3%. It has moreover proven useful for the longitudinal shrinkage to be>−0.5%, preferably>0.0%, in particular>1.0%.

The novel films have surprisingly low thickness variation over the film width, typically less than 20%. Uniform thickness profiles of this type cannot be achieved with offline relaxation processes or processes in which there is free relaxation. In the novel process the thickness of the film is measured continuously across its entire width prior to wind-up. The measured values obtained are used to adjust the gap width of the extrusion die so as to correct for any thin and thick areas which arise.

The novel process also comprises winding the film so produced.

Films obtainable by the novel process and the novel films described have excellent suitability for producing SMD capacitors. These capacitors are produced by conventional and well-known processes. These usually begin by metallizing and cutting the films, and the resultant strips of metallized film are then mutually superposed in layers. These stacks, or windings, are annealed, then provided with contacts and trimmed to an appropriate size.

What is claimed is:

1. A process for producing a biaxially oriented film of thickness <10 μm, which comprises:

(A) extruding a polymer melt through the gap of an extrusion die onto a chill roll to produce a film;

(B) stretching the film longitudinally and transversely;

(C) relaxing the film longitudinally by >0.1% and transversely by >3%, where the edges of the film are held during the longitudinal and transverse relaxation; and (D) winding the film.

2. The process as claimed in claim 1, wherein the relaxation takes place in a simultaneous stretching frame.

3. The process as claimed in claim 1, wherein the longitudinal and transverse stretching takes place in a simultaneous stretching frame.

4. The process as claimed in claim 1, wherein the longitudinal relaxation is >0.5% and the transverse relaxation is >5%.

5. The process as claimed in claim 1, wherein the thickness variation across the film width is <20%.

6. The process as claimed in claim 1, further comprising measuring the thickness of the film before winding to control the extrusion die gap width and to correct for the occurrence of thin and thick areas of the film.

7. A process for producing SMD capacitors, which comprises preparing an SMD capacitor using a film with MD shrinkage at 200° C. of <3.3% and TD shrinkage at 200° C. of <2%.

* * * * *